F. BALZER.
CENTRIFUGAL EXTRACTOR.
APPLICATION FILED JULY 16, 1915.
1,224,888.
Patented May 8, 1917.
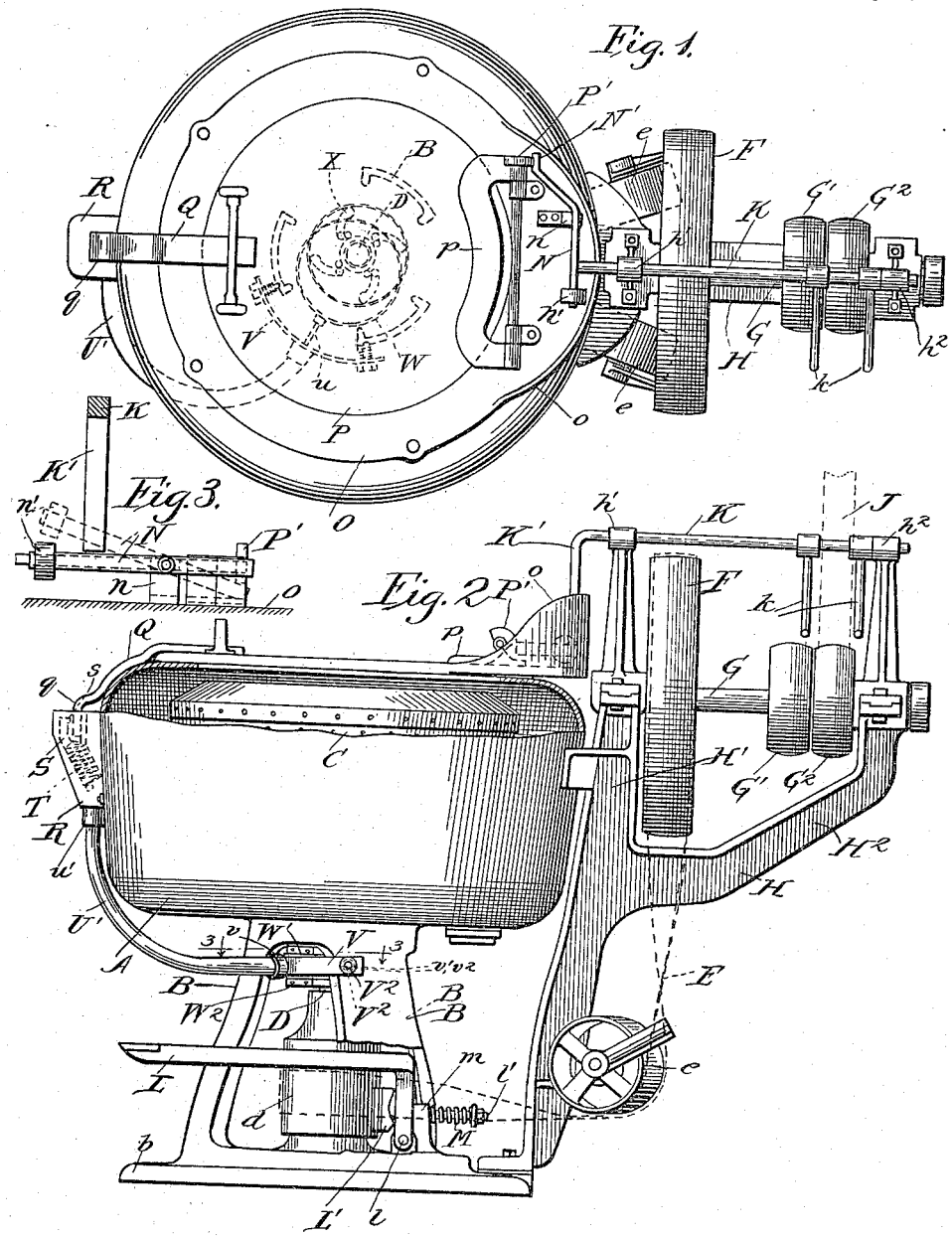
Witness:
C. E. Burnap
Inventor:
Fritz Balzer
By Sheridan, Wilkinson and Scott, Att'ys

UNITED STATES PATENT OFFICE.

FRITZ BALZER, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

CENTRIFUGAL EXTRACTOR.

1,224,888.      Specification of Letters Patent.      Patented May 8, 1917.

Original application filed April 6, 1912, Serial No. 688,618. Divided and this application filed July 16, 1915.
Serial No. 40,261.

*To all whom it may concern:*

Be it known that I, FRITZ BALZER, a subject of the German Emperor, residing at Chicago, in the county of Cook and State of Illinois, have invented certain new and useful Improvements in Centrifugal Extractors, of which the following is a specification.

This invention relates in general to safety mechanism for machinery, and more particularly to centrifugal extractors, such as disclosed in my Patent No. 1,152,266, granted August 31st, 1915, of which my present application is a division.

My said patent covers improved automatic mechanism for locking the cover of a centrifugal extractor in closed position during the rotation of the inclosed basket so as to prevent access to the basket while it is in rotation, and thereby prevent injury to the operators. It is, however, necessary that the cover should be closed before the power is applied to rotate the basket in order that the automatic locking mechanism may accomplish the purpose desired.

My present invention has for its object the provision of simple and efficient means for insuring the closing of the cover before the power is applied to the basket, such means being preferably used in conjunction with automatic mechanism for retaining the cover in closed position as long as the basket continues to rotate, even while the basket is rotating by momentum after the disconnection of the driving power.

My invention will be more fully disclosed hereinafter with reference to the accompanying drawings, in which the same is illustrated as embodied in a convenient and practical form, and in which;

Figure 1 is a plan view of a centrifugal extractor equipped with my invention;

Fig. 2 is a side elevational view, a portion of the casing being broken away; and Fig. 3 is an enlarged detail view of the interlocking connection between the cover and the power controlling means.

The same reference characters are used to designate the same parts in the several figures of the drawings.

A indicates the casing, or curb, of the extractor which is provided with a supporting base B having a platform $b$ at the bottom thereof, which may be secured to the floor. C designates the perforated basket within the casing A which is adapted to receive the articles from which the water is to be extracted. D designates a shaft which is suitably connected to the basket C to rotate the same. $d$ indicates a pulley fixed upon the shaft D and around which passes a belt E. The belt E passes around idler pulleys $e$ and thence around a large pulley F fixed upon a counter-shaft G. A bracket H is secured to the casing A and is provided with diverging arms $H'$ and $H^2$ in the ends of which the shaft G is journaled.

$G'$ indicates a pulley fixed upon the shaft G, while $G^2$ indicates a pulley loosely mounted upon the shaft G. J indicates the power belt which is adapted to be shifted from the loose pulley to the tight pulley, or vice versa, by suitable belt shifting means. I have shown in the drawings a belt shifting means comprising a rod K which is mounted to reciprocate in bearings $h'$ and $h^2$ projecting upwardly from the arms of the bracket H. $k$ designates a pair of curved rods secured to the reciprocating rod K to engage the opposite edges of the power belt.

L designates a foot-operated brake lever which is pivotally connected at $l$ to the base B of the machine. $L'$ indicates the brake shoe which is adapted to engage the pulley $d$ intermediate the two sides of the belt E. The shoe $L'$ is connected to a rod $l'$ which extends through the lever L and also through a bracket $m$ fixed upon the base of the machine. A spring M surrounds the rod $l'$ and is interposed between the bracket $m$ and a nut on the outer end of the rod $l'$, the tension of the spring being such as to normally hold the brake shoe out of contact with the pulley $d$ and to be compressed by foot-power applied to the lever L and permit the brake shoe to engage the pulley.

O designates a circular plate surrounding the opening through the top of the casing A which is provided with a water guard $o$. P designates a cover which is pivoted by a hinge $p$ to the plate O and when closed prevents access to the interior of the casing and the basket inclosed therein.

The centrifugal extractor described does not in itself constitute my invention, but is illustrated and described in order that my invention may be fully disclosed. It will be obvious from the subsequent description that my invention is not limited in its application to a centrifugal extractor of the specific construction above described, but is capable of use in connection with other forms of centrifugal extractors, and similar machines.

P' designates a cam secured to, and preferably forming part of, the hinge portion p which is secured to the cover P, such cam being adapted to engage one end N' of a lever N fulcrumed intermediate of its ends upon a bracket n secured to the casing A. The opposite end of the lever N is provided with a counterbalance n' so as to normally oscillate the lever N to a position below the lower end of a downwardly extending portion K' of the belt shifting rod K. The position of the cam P' is such that when the cover P is lifted, it will engage the end N' of the lever N and oscillate the latter, so that it will be elevated into a position in the path of the lower end of the depending portion K' of the belt shifting rod K in a manner which will be more fully hereinafter described.

Q designates a hasp fixed to the cover and having a depending portion q having an opening therein adapted when the cover is closed to be projected through an opening r in the upper end of a latch casing R. The latch casing R is secured in any suitable manner to the outer surface of the extractor casing A and contains a reciprocating latch S having a hook s at its upper end adapted to engage the opening in the lower end q of the hasp Q. The latch S is engaged by a spring T, the tension of which normally disengages the hook s from the opening in the lower end of the hasp Q. u designates a flexible connection leading from the lower end of the latch S through a flexible tubular casing U'. One end of the tubular casing U' is secured by a suitable coupling u' to the bottom wall of the latch casing R, while the opposite end of the tubular casing U' is secured to a curved plate V by any suitable coupling v. The opposite ends of the curved plate V are provided with holes through which extend bolts V' and V², the latter being secured to adjacent legs B and B of the base which support the extractor. Springs v' and v² surround the bolts V' and V² and are interposed between the plate V and the respective legs B. The chain, or flexible cable, u, one end of which is secured to the latch S, after passing through the tube U', passes through a hole in the plate V registering with the tube, and is then connected with a circular band W, surrounding the shaft D. Located within the circular band W are a series of weighted arms X, each of which is pivotally connected adjacent its inner end to the shaft D so as to rotate therewith.

The operation of my improvements in centrifugal extractors, and the like, is as follows: Assuming that the belt shifter is in the position to locate the driving belt J on the loose pulley G²—as shown in Figs. 1 and 2—and that the cover P is raised, the articles from which the water is to be extracted are placed within the perforated basket C. When the cover is in its open position, the cam P' retains the lever N in position to overlie the lower end of the depending portion K' of the belt shifting rod, and hence prevents the belt from being shifted to the tight pulley.

The cover P is then closed, which oscillates the cam P' away from the end N' of the lever N, and permits the weight n' to swing the lever downwardly below the lower end of the depending portion K' of the belt shifting rod. The rod K is then reciprocated toward the left in any convenient manner, as by grasping the depending portion K' thereof, thereby shifting the power belt J to the tight pulley G' and rotating the basket C through the medium of the belt E and pulleys F and d.

As the basket acquires speed, the weighted levers X are thrown outwardly by centrifugal action, inasmuch as they are carried by the spindle D. The outward movement of the weighted levers moves the circular band W into a position concentrically around the spindle D, thereby exerting a pull upon the chain u, which draws the latch S downwardly against the tension of the springs T. The downward movement of the latch S causes the hook s on its upper end to engage within the opening in the lower end of the hasp Q, thereby securely locking the cover P in closed position. The cover continues to be locked in closed position as long as the spindle D, and with it the basket C, continues to be driven, and as long as it continues to rotate by momentum until its reduction in speed has been such that the centrifugal action upon the weighted levers X is less than the tension of the springs T, at which time the tension of such springs forces upwardly the latch S out of engagement with the hasp Q and coincidentally moves the circular band W into the eccentric position shown in dotted lines in Fig. 3. The tension of the springs T is so related to the weighted levers X that the latch S will only be disengaged from the hasp Q when the speed of the basket has been so reduced that there is no danger of injury to the operator should he lift the cover P and insert his hands into the basket.

After the power has been disconnected from the basket by shifting the rod K toward the right in Figs. 1 and 2, the rotation of the basket may be quickly stopped by applying pressure to the brake lever L, thereby securing the unlocking of the cover P, but should the operator fail to use the brake with sufficient force to practically stop the rotation of the basket, it will be impossible for him to raise the cover, and hence he will be automatically protected from injury.

After the basket has practically ceased rotating and the latch has consequently been disengaged from the hasp, the cover may be lifted, which automatically oscillates the lever N into position to prevent the shifting of the belt to the tight pulley as long as the cover remains open.

From the foregoing description it will be observed that I have invented an improved means for preventing the application of power to a driven element of a machine, such, for instance, as the basket of a centrifugal extractor until after the protecting guard or cover has been closed, thereby preventing the danger of injury to the operators which would exist if it were possible to apply the driving power to the machine while the guard or cover remained in position to expose the moving basket.

While I have disclosed my said invention in connection with the automatic locking mechanism covered by my said patent, yet it will be understood that my present invention is capable of use independently of such automatic locking mechanism, as it alone accomplishes the important function of preventing the operation of the machine while the protecting cover remains open.

I claim:

1. In a centrifugal extractor, the combination with the rotary basket thereof, of means controlling the application of power to said basket, a cover for preventing access to said basket, a lever mounted upon a fixed fulcrum at one side of said cover, and a projection on said cover for oscillating said lever when the cover is opened into position to obstruct the operation of said controlling means to apply power to the basket, said lever being automatically movable upon the closing of said cover into a position to permit the operation of said controlling means.

2. In a centrifugal extractor, the combination with a casing, of a cover for said casing, a rotary basket within said casing, means controlling the application of power to said basket, a lever mounted upon said casing, means on said cover for oscillating said lever when the cover is open into position to obstruct the operation of said controlling means to apply power to the basket, and means for automatically oscillating said lever to a position to permit the operation of said controlling means to apply power to said basket when the cover is closed.

3. In a centrifugal extractor, the combination with a casing, of a cover for said casing, a rotary basket within said casing, belt shifting mechanism controlling the application of power to said basket, a lever mounted upon said casing, a cam on said cover adapted to oscillate said lever when the cover is opened into the path of movement of said belt shifting mechanism to obstruct the application of power to said basket, and means on said lever for oscillating the same out of the path of said belt shifting mechanism when said cover is closed.

4. In a centrifugal extractor, the combination with a casing, of a cover for said casing, a rotary basket within said casing, belt shifting mechanism controlling the application of power to said basket, a lever fulcrumed intermediate of its ends upon said casing, and a projection movable with said cover to engage one end of said lever when the cover is opened, and moving the other end of said lever into the path of movement of said belt shifting mechanism to obstruct the application of power to said basket, said lever being automatically movable when disengaged by said projection into a position out of the path of said belt shifting mechanism.

In testimony whereof, I have subscribed my name.

FRITZ BALZER.

Witnesses:
C. M. LEARY,
D. S. MANN.

Copies of this patent may be obtained for five cents each, by addressing the "Commissioner of Patents, Washington, D. C."